Patented Jan. 8, 1952

2,581,909

UNITED STATES PATENT OFFICE 2,581,909

STABILIZATION OF ACRYLONITRILE-BUTA-
DIENE-1,3 COPOLYMERS

Harry E. Albert and George E. P. Smith, Jr.,
Akron, Ohio, assignors to The Firestone Tire &
Rubber Company, Akron, Ohio, a corporation
of Ohio No Drawing. Application March 30, 1949,
Serial No. 84,493

2 Claims. (Cl. 260—45.75)

This invention relates to the stabilization of the rubber-like polymerizates of 1,3-butadiene and more generally rubber-like polymerizates of a conjugated diene. The conjugated-diene monomers include, for example, 1-3-butadiene, isoprene, 2-cyanobutadiene-1,3, cyclopentadiene, piperylene, dimethylbutadiene-1,3, 2-methyl-1,3-pentadiene, etc. The polymerizates may be polymers. They may be copolymers of 1,3-butadiene or other conjugated-diene monomer with a vinyl monomer, e. g., styrene, alpha-methyl styrene, nuclear-substituted styrenes, monochlorostyrene, dichlorostyrene, vinylnaphthalene, vinylbiphenyl, vinylcarbazole, 2-vinyl-5-ethyl-pyridine, 2-ethyl-5-vinyl-pyridine, acrylonitrile, methacrylonitrile, alpha chloroacrylonitrile, propacrylonitrile, acrylamide, esters of acrylic acid and its homologues which contain one to five carbons in the ester group, etc. The stabilizer used is an antimonyl derivative of a polyhydroxy aromatic compound containing two ortho-hydroxy groups in which the hydrogens of the two ortho-hydroxy groups are replaced by antimony. The invention includes the stabilized polymerizates, both cured and uncured, and the process of stabilization. A particular application of the invention is in the stabilization of rubber compounds which are white or pastel shades—for example, the white sidewalls of tires, etc.—because the stabilizers of this invention do not discolor.

Difficulty has been experienced in finding a satisfactory non-discoloring stabilizer for synthetic rubbers. Phenyl-beta-naphthylamine, which is the most widely used stabilizer for GR-S, discolors badly.

The stabilizers of this invention include such compounds as:

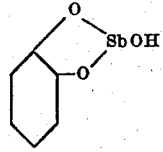

Antimonyl catecholate

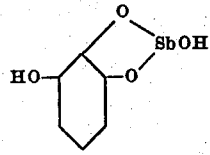

Antimonyl pyrogallolate

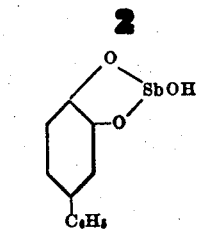

Antimonyl p-phenyl catecholate

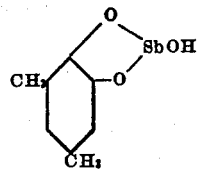

Antimonyl-4,6-dimethyl catecholate

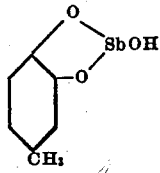

Antimonyl-4-methyl catecholate

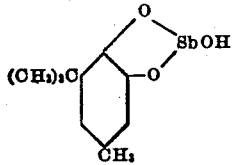

Antimonyl-4-methyl, 6-tert-butyl catecholate

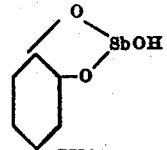

Antimonyl-4-tert-butyl catecholate

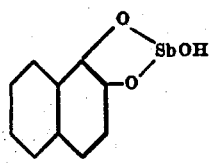

Antimonyl-1,2-dihydroxynaphthalene

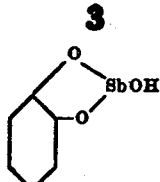
Antimonyl-4-tert-octyl catecholate

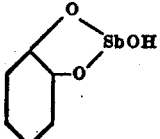
Antimonyl-4-chloro catecholate

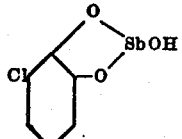
Antimonyl-4-tert-butyl-6-chloro catecholate

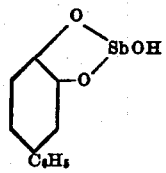
Antimonyl-4-phenyl catecholate

STABILIZATION OF GR-S TYPE SYNTHETIC RUBBERS

Various tests were conducted to show the stabilizing properties of the antimonyl derivatives of this invention on both the rubber-like copolymer of butadiene and styrene known more generally as GR-S and various vulcanizates prepared from this copolymer. The tests include comparisons to show the nondiscoloring properties of the stabilizers of this invention.

The results recorded in the first table were carried out on copolymer obtained by coagulation of regular GR-S latex with ordinary crude aluminum sulfate (unless the contrary is indicated). Wherever a stabilizer was used, whether with the uncured copolymer or with the vulcanizate, 2 per cent of the stabilizer (based on the dry weight of the copolymer) was added to the latex before coagulation.

The first few tables include the results of a hand test made on the copolymers. This test was made by pulling and feeling the copolymer to detect any stiffening or softening or other sign of deterioration. The copolymer tested was the copolymer of styrene and 1,3-butadiene, known as GR-S. Two per cent of each of the stabilizers were added to the latex resulting from emulsion copolymerization of these monomers. The stabilizers were added to the latex in an emulsion, and in preparing the blank of Table I, the emulsion was added to the latex, but without any stabilizer.

*Table I.—Polymer aging (hand test)*

| Stabilizer | After Drying 20 Hours at 75° C. | After Heat-Aging at 90° C.— | | |
|---|---|---|---|---|
| | | One Day | Two Days | Four Days |
| 2% antimonyl catecholate | No deterioration | No change | No change | No change. |
| 2% antimonyl pyrogallolate | do | do | do | Slightly set up. |
| blank | Slightly hardened | Hardened | | |
| 2% catechol | No deterioration | No change | Set up | Slightly hardened. |

The data illustrate the superiority of the antimonyl derivatives over the blank which contained no antioxidant. The antimonyl derivatives are both definitely superior to catechol.

In the next table the copolymer was obtained by coagulation with low-iron aluminum sulfate of various batches of GR-S latex to which different stabilizers had been added. The high iron in ordinary crude aluminum sulfate accelerates the aging of the copolymer. The effect of adding varying amounts of different stabilizers is recorded. The discoloration is noted as well as change in physical properties.

*Table II.—Copolymer aging test*

| Stabilizer | Per Cent on Copolymer | After Drying 20 Hours at 75° C. | | Heat-aging at 90° C. | | | | Heat-aging at 120° C. | | | |
|---|---|---|---|---|---|---|---|---|---|---|---|
| | | | | Two Days | | Four Days | | One Day | | Two Days | |
| | | Color | Hand Test | Color | Hand Test | Color | Hand Test | Color | Hand Test | Color | Hand Test |
| antimonyl catecholate | .5 | light gray | no deterioration | light gray | no change | very light gray-brown | no change | light brown | no change | brown | somewhat set up. |
| Do | 1.0 | grayish-white | do | do | do | light gray | do | gray | somewhat set up | gray-brown | Do. |
| Do | 2.0 | do | do | do | do | very light gray | do | do | slightly set up | do | Do. |
| antimonyl p-phenyl catecholate | 1.0 | very light pink | do | cream color | do | cream color | do | light brown | do | light brown | Do. |
| Do | 2.0 | do | do | do | do | do | do | do | do | do | Do. |
| phenyl-beta-naphthylamine | .5 | brown | do | brown | do | brown | do | dark brown | set up | dark brown | set up. |
| Do | 1.0 | do | do | do | do | do | do | do | do | do | somewhat set up. |
| Do | 2.0 | do | do | do | do | do | do | do | somewhat set up | do | Do. |

The above data show that the antimonyl catecholate and antimonyl p-phenyl catecholate have antioxidant properties at least equal to those of phenyl-beta-naphthylamine, which is recognized as being a very excellent GR-S antioxidant. Phenyl-beta-naphthylamine is objectionable because it discolors. The antimonyl derivatives of this invention are, therefore, preferred to phenyl-beta-naphthylamine for various uses as in the production of white sidewall tires and other places where white or pastel shades are used.

In the next table the antioxidant effect of antimonyl catecholate is compared to that of phenyl-beta-naphthylamine and another commercial stabilizer identified herein as stabilizer A. Two per cent of each stabilizer was used. Phenyl-beta-naphthylamine is recognized as an excellent antioxidant for GR-S but is objectionable because it discolors. Stabilizer A is one of the best commercial non-discoloring antioxidants for GR-S. The tests were conducted on samples obtained by coagulation of GR-S latex with low-iron aluminum sulfate.

Table III
Copolymer aging test

| Stabilizer | Antimonyl Catecholate | Stabilizer A | Phenyl-beta-Naphthylamine |
|---|---|---|---|
| After Drying 22 Hrs at 72° C: | | | |
| Color | Light gray | Medium dark gray | Brown. |
| Hand Test | No deterioration | No deterioration | No deterioration. |
| Heating at 90° C: | | | |
| 2 Days— | | | |
| Color | Light gray | Medium dark gray-brown | Brown. |
| Hand Test | No change | No change | No change. |
| 4 Days— | | | |
| Color | Light gray | Medium dark gray-brown | Brown. |
| Hand Test | No change | No change | No change. |
| Subsequent Heating at 110° C: | | | |
| 2 Days— | | | |
| Color | Gray | Brown | Dark brown. |
| Hand Test | No change | Slightly set up | Slightly set up. |
| 4 Days— | | | |
| Color | Gray | Brown | Dark brown. |
| Hand Test | Very slightly set up | Set up | Somewhat set up. |

The data show that the antimonyl catecholate is a more powerful antioxidant than either stabilizer A or phenyl-beta-naphthylamine and that antimonyl catecholate discolors less than stabilizer A.

In the following table the antioxidant effect of two other antimonyl derivatives is compared with that of stabilizer A. The samples used were obtained by coagulation of GR-S latex with low-iron aluminum sulfate. Two per cent of each stabilizer was used.

The data show that the two antimonyl derivatives of alkylated catechols are superior to stabilizer A as an antioxidant.

The following tests were conducted on vulcanizates prepared according to different formulae. The antioxidant was added to GR-S latex which was then coagulated with crude aluminum sulfate so that the coagulum of copolymer referred to in each of the following formula had 2 per cent of the antioxidant incorporated in it.

FORMULA A

| | |
|---|---|
| GR-S copolymer containing 2% stabilizer | 100.00 |
| Coal tar plasticizer | 3.00 |
| Pine tar | 3.00 |
| Stearic acid | 3.00 |
| Zinc oxide | 5.00 |
| Accelerator | 1.20 |
| Channel black | 50.00 |
| Sulfur | 2.00 |

This black tread stock was subjected to cures for 60, 80, and 120 minutes at 280° F., and the values given in the following table are averages of tests on the three cures:

The table shows that compared to phenyl-beta-naphthylamine, which is recognized as an excellent antioxidant for GR-S, antimonyl catecholate is superior in that, on aging, it gives a lower percentage of increase in modulus, a greater percentage retention of original tensile, and greater percentage retention of elongation.

Two per cent of stabilizer A and each of several antimonyl antioxidants were added to GR-S latices which were then coagulated with low-iron aluminum sulfate and the coagulum compounded according to the following formula. Various tests were run on such stocks:

FORMULA B

| | |
|---|---|
| Copolymer containing 2% stabilizer | 100.00 |
| Coumarone resin | 10.00 |
| Accelerator | 1.10 |
| Wax | 2.00 |
| Magnesium oxide | 8.00 |
| Zinc oxide | 100.00 |
| Ultramarine blue | 0.10 |
| Titanium dioxide | 30.00 |
| Insoluble sulfur | 4.00 |

The samples compounded as above were cured 30, 50, and 70 minutes at 290° F. The values given in the following table are averages of these three cures. The table records the normal properties of the vulcanizate and compares them with the properties of an identical compound stabilized with stabilizer A.

Table IV.—Copolymer aging (hand test)

| Stabilizer | After Drying 20 Hours at 75° C. | After Heat-aging at 110° C. | | |
|---|---|---|---|---|
| | | One Day | Two Days | Four Days |
| antimonyl-4,6-dimethyl catecholate | No deterioration | Unchanged | Unchanged | Unchanged. |
| antimonyl-4-methyl, 6-tert-butyl catecholate | do | do | do | Slightly set up. |
| Stabilizer A (control) | do | do | do | Somewhat set up. |

Table V

|  | Stabilizer | |
| --- | --- | --- |
|  | Antimonyl Catecholate | Phenyl-beta-Naphthylamine |
| 200% Modulus: | | |
| Normal | 400 | 450 |
| Aged | 1,160 | 1,500 |
| Per Cent of Normal | 290.0 | 333.0 |
| Tensile: | | |
| Normal | 2,775 | 3,125 |
| Aged | 2,675 | 2,550 |
| Per Cent of Normal | 95.4 | 81.6 |
| Elongation: | | |
| Normal | 675 | 605 |
| Aged | 410 | 310 |
| Per Cent of Normal | 60.7 | 51.2 |

(Modulus and tensile strength are reported herein as pounds per square inch.)

The above data show that antimonyl catecholate gives a white zinc oxide stock with normal properties.

The white zinc oxide stocks were subjected to artificial aging in a fadeometer and under a General Electric sunlamp, the latter being at a distance of 7 inches. The results of tests on samples cured 50 minutes at 290° F. are recorded in the following table and are there compared with tests on identical stock containing stabilizer A instead of the antimonyl catecholate.

Table VI

|  | Stabilizer | |
| --- | --- | --- |
|  | Antimonyl Catecholate | Stabilizer A (Control) |
| 300% Modulus | 350 | 325 |
| 400% Modulus | 680 | 670 |
| Tensile | 1,250 | 1,250 |
| Elongation | 530 | 520 |

Table VII.—Artificial exposure tests

|  | Stabilizer | |
| --- | --- | --- |
|  | Antimonyl Catecholate | Stabilizer A (Control) |
| Fadeometer at 125° F.: | | |
| 4 Hours | White | Medium brown. |
| 10 Hours | Light cream | Brown. |
| Sunlamp: | | |
| 8 Hours | White | Dark tan. |
| 16 Hours | Light cream | Brown. |

The same stocks were subjected to natural weathering. These stocks were tapered dumbbell strips of material cured 50 minutes at 290° F., stretched 12½ per cent on racks.

Table VIII.—Natural exposure tests

|  | Stabilizer | |
| --- | --- | --- |
|  | Antimonyl Catecholate | Stabilizer A (Control) |
| 2 Months in Florida | White | Tan. |
| 2 Months in Florida+2 Months in Ohio. | do | Do. |

The Florida aging tests were started in February. The Ohio tests were started in May.

The results in Tables VII and VIII show antimonyl catecholate to be superior to stabilizer A under both artificial and natural exposure.

Exposure tests were conducted on other white stocks similarly compounded but using two per cent of other antioxidants. The stocks were cured 50 minutes at 300° F. The artificial exposure tests were conducted in a fadeometer and under a General Electric sunlamp at a distance of 7 inches.

Table IX.—Artificial exposure tests

| Stabilizer | Fadeometer at 125° C. | | Sunlamp | |
| --- | --- | --- | --- | --- |
|  | 5 Hours | 10 Hours | 8 Hours | 16 Hours |
| antimonyl 4,6-dimethyl catecholate. | Slightly discolored. | Cream | Very slightly discolored. | Light tan. |
| antimonyl-4-methyl, 6-tert-butyl catecholate. | do | do | do | Do. |
| antimonyl-4-tert-butyl catecholate. | do | do | do | Do. |
| Stabilizer A (control) | Tan | Light brown | Light tan | Dark tan. |

The natural exposure tests were conducted on tapered dumbbell strips of stock cured 50 minutes at 300° F. and stretched 12½ per cent. The tests were conducted in Akron, Ohio. Both tests started in May.

Table X.—Natural exposure tests

| Stabilizer | 1 Month | 2 Months |
| --- | --- | --- |
| antimonyl-4,6-dimethyl catecholate | White | White. |
| antimonyl-4-methyl, 6-tert-butyl catecholate | do | Do. |
| antimonyl-4-tert-butyl catecholate | do | Do. |
| Stabilizer A (control) | Light tan | Tan. |

STABILIZATION OF BUNA N-TYPE SYNTHETIC RUBBERS

Various tests are given below on different Buna N compounds showing the effect of the stabilizers of this invention and comparing the stabilizers of this invention with phenyl-beta-naphthylamine, the most widely used commercial product. Each of the stabilized compounds referred to was obtained by adding 2 parts of the stabilizer per 100 parts of copolymer to the latex resulting from emulsion copolymerization of acrylonitrile and 1,3-butadiene. The latex was then coagulated and dried, and the samples for tests on the vulcanizate were prepared by vulcanization of such dried coagulum. In testing the copolymer the same hand test was employed as in testing GR–S copolymer.

The commercial stabilizers discolor Buna N-type rubbers badly, particularly on exposure to ultraviolet light. Most of the tests recorded, therefore, refer to change in color of the products and compare the color and color change with a control or blank. Tables XI, XII and XIII refer to tests conducted on a copolymer obtained by copolymerization of 62 per cent butadiene and 32 per cent acrylonitrile.

Table XI.—Copolymer stabilization

| Stabilizer | Condition after Drying at 75° C. | | Heat-aging at 90° C. | | | | | |
| --- | --- | --- | --- | --- | --- | --- | --- | --- |
| | | | One Day | | Two Days | | Three Days | |
| | Color | Hand Test | Color | Hand Test | Color | Hand Test | Color | Hand Test |
| Antimonyl catecholate | chalky white. | no deterioration. | light gray | no change | light gray | no change | light gray | slightly set up. |
| phenyl-beta-naphthylamine. | light brown. | do | light brown. | slightly set up. | light brown. | slightly set up. | light brown. | Do. |

The above data show the superiority of antimonyl catecholate over phenyl-beta-naphthylamine in preservation of both the color and plasticity of the butadiene-acrylonitrile copolymer.

The next table shows a further comparison.

Table XII.—Copolymer stabilization

| Stabilizer | Condition after Drying at 75° C. | | Heat-aging at 90° C. | | | |
| --- | --- | --- | --- | --- | --- | --- |
| | | | One Day | | Four Days | |
| | Color | Hand Test | Color | Hand Test | Color | Hand Test |
| antimonyl catecholate | chalky white. | no deterioration. | gray-tan | slightly set up | tan | slightly set up. |
| antimonyl p-phenylcatecholate | do | do | cream | do | cream | set up. |
| phenyl-beta-naphthylamine | light brown. | do | dark brown. | do | brown | Do. |

The above data show the antimonyl catecholates to be at least equivalent to phenyl-beta-naphthylamine, which is considered to be a very active antioxidant for Buna N, and to be superior from the standpoint of color.

Results of the use of a different test stabilizer are recorded in the following table:

Table XIII.—Copolymer stabilization

| Stabilizer | After Drying at 75° C. | | After Heat-aging 2 days at 90° C. | |
| --- | --- | --- | --- | --- |
| | Color | Hand Test | Color | Hand Test |
| antimonyl pyrogallolate | gray | no deterioration. | gray | good condition. |
| phenyl-beta-naphthylamine. | brown. | do | brown. | Do. |

The above data show the antimonyl pyrogallolate to be as good as phenyl-beta-naphthylamine from the standpoint of preservation of plasticity and better from the standpoint of preservation of color.

In Tables XIV and XV the copolymer tested was obtained by copolymerization of 55 per cent butadiene and 45 per cent acrylonitrile. The material was tested against two commercial stabilizers, one of which is identified simply as stabilizer A.

Table XIV.—Copolymer stabilization

| Stabilizer | Condition after Aging at 90° C. Hand Test | |
| --- | --- | --- |
| | One Day | Two Days |
| antimonyl catecholate | slightly set up | slightly set up. |
| Stabilizer A | do | Do. |
| phenyl-beta-naphthylamine | do | Do. |

The above data show the substantial equivalence of antimonyl catecholate and two widely used commercial stabilizers from the standpoint of preservation of plasticity.

In the next test, comparison was made with a blank which contained no stabilizer.

Table XV.—Copolymer stabilization

| Stabilizer | After Drying at 75° C. | | After Oven-aging 4 Days at 100° C. | |
| --- | --- | --- | --- | --- |
| | Color | Hand Test | Hand Test | Mill Breakdown |
| antimonyl catecholate | gray | no change. | fair condition. | Sec. 43 |
| blank | dirty brown. | somewhat set up. | very poor condition. | 210 |

Mill breakdown is a measure of the degree of set-up of a copolymer. It is determined by twice folding the copolymer sample, passing it through the mill once with the rolls separated .05 inch, and then milling until a smooth band is obtained. The time in seconds (exclusive of the initial pass) is recorded as the mill breakdown.

Tests on vulcanizates differently compounded were made using different copolymers of butadiene and acrylonitrile, and changes in the physical properties are recorded as well as the results of exposure to light high in ultraviolet rays.

The first tests on a vulcanizate refer to a vulcanizate obtained on a copolymer prepared from 55 per cent butadiene and 45 per cent acrylonitrile compounded according to the following formula:

FORMULA C

| | |
| --- | --- |
| Copolymer containing 2% stabilizer | 100.00 |
| Sulfur | 2.00 |
| Zinc oxide | 5.00 |
| Channel black | 40.00 |
| Accelerator | 1.30 |
| Stearic acid | 3.50 |

Vulcanizates obtained by curing 60 and 80 minutes at 274° F. were tested, and the average of the properties obtained on these different cures are recorded in the following table:

Table XVI.—Vulcanizate properties

| Stabilizer | Tensile Strength | | Elongation | |
|---|---|---|---|---|
| | Normal | Aged | Normal | Aged |
| antimonyl catecholate | 3,740 | 4,025 | 640 | 365 |
| blank (no antioxidant) | 3,415 | 3,090 | 350 | 250 |

The "aged" material was heated in an oven 4 days at 100° C.

The above vulcanizate data show the normal and aged properties of the vulcanizate containing the antimonyl catecholate to be vastly superior to that which contains no antioxidant.

The following table records properties of vulcanizate prepared from copolymer cured 60 and 80 minutes at 274° F. and then aged 4 days at 100° C.

Table XVII.—Properties of aged vulcanizate

| Stabilizer | Tensile | Elongation |
|---|---|---|
| antimonyl catecholate | 4,400 | 545 |
| phenyl-beta-naphthylamine | 4,275 | 550 |
| blank (no antioxidant) | 3,425 | 340 |

The above data show the stabilizing value of antimonyl catecholate by showing that a vulcanizate prepared from aged copolymer containing this stabilizer is equivalent to one similarly prepared from aged copolymer containing phenyl-beta-naphthylamine. Both are superior to the aged vulcanizate obtained from copolymer containing no stabilizer.

Copolymer obtained by copolymerization of 68 per cent butadiene and 32 per cent acrylonitrile was compounded according to the following formula:

FORMULA D

| | |
|---|---|
| Copolymer containing 2% stabilizer | 100.00 |
| Sulfur | 2.00 |
| Carbon black | 50.00 |
| Stearic acid | 3.50 |
| Zinc oxide | 5.00 |
| Accelerator | 1.30 |

The compounded stock was cured 60 and 120 minutes at 274° F. The average of the properties of stocks subjected to the different cures is recorded in the following table. The tests include those made on vulcanizate heated 4 days in an oven at 100° C. for comparison.

Table XVIII.—Properties of vulcanizate

| Stabilizer | Tensile Strength | | | Elongation | | |
|---|---|---|---|---|---|---|
| | Normal | Aged | Percent of Normal | Normal | Aged | Percent of Normal |
| antimonyl catecholate | 3,050 | 2,775 | 91.0 | 345 | 180 | 52.2 |
| phenyl-beta-napthylamine | 3,150 | 2,750 | 87.3 | 375 | 200 | 53.4 |

The above data show the substantial equivalence of phenyl-beta-naphthylamine and antimonyl catecholate in preservation of the tensile and elongation properties on aging.

The next table records the physical properties obtained on vulcanizate produced from copolymer aged 2 days at 90° C. before compounding.

The stabilizers were added to the uncured copolymer in latex form and were, therefore, present during the aging.

Table XIX.—Properties of vulcanizate obtained from aged copolymer

| Stabilizer | Tensile Strength | Elongation |
|---|---|---|
| antimonyl catecholate | 3,200 | 390 |
| phenyl-beta-naphthylamine | 2,900 | 360 |

The above data show that the vulcanizate obtained from aged copolymer containing antimonyl catecholate was somewhat superior to that containing phenyl-beta-naphthylamine.

Copolymer obtained by copolymerization of 55 per cent butadiene and 45 per cent acrylonitrile was heavily loaded with white pigment and compounded for vulcanization. Copolymer containing different stabilizers was used in the compounding. The formula used was:

FORMULA E

| | |
|---|---|
| Copolymer containing 2% stabilizer | 100.00 |
| Coumarone resin | 7.50 |
| Sulfur | 3.00 |
| Magnesium oxide | 5.00 |
| Zinc oxide | 85.00 |
| Fine particle kaolin | 20.00 |
| Titanium dioxide | 20.00 |
| Benzothiazyl disulfide | 0.90 |
| Zinc diethyl dithiocarbamate | 0.40 |

The compounded stocks were cured 40 and 60 minutes at 280° F. In the following table the figures given are the averages of those obtained on the different cures.

Table XX.—Properties of vulcanizate

| Stabilizer | Tensile Strength | | | Elongation | | |
|---|---|---|---|---|---|---|
| | Normal | Aged | Percent of Normal | Normal | Aged | Percent of Normal |
| antimonyl catecholate | 1,750 | 1,275 | 72.8 | 410 | 250 | 61.0 |
| phenyl-beta-naphthylamine | 1,550 | 1,100 | 71.0 | 350 | 220 | 62.7 |

The "aged" stock referred to in the table was heated 4 days in an oven at 212° F.

The results recorded in the above table show antimonyl catecholate and phenyl-beta-naphthylamine to be about equivalent in a white stock with respect to normal and aged tensile properties and also with respect to elongation.

Exposure tests were conducted on heavily loaded white stock of the preceding formula. The stocks cured 40 and 60 minutes at 280° F. gave the same test results. The stocks were tested 10 hours in a fadeometer at 125° F. They were also tested by exposing 16 hours to a General Electric sunlamp at 7 inches. The results are recorded in the following table:

Table XXI.—Exposure tests

| Stabilizer | Fadeometer | Sunlamp |
|---|---|---|
| antimonyl catecholate | Cream | Very light cream. |
| phenyl-beta-naphthylamine | Brown | Gray-brown. |
| Stabilizer A | Light tan | Light tan. |

The exposure tests show the superiority of the stabilizers of this invention over each of the widely used commercial stabilizers.

The formulae given are illustrative. Different copolymers may be used, and with different compounding ingredients and different amounts of the different stabilizers. In general it may be said that 0.1 to 10.0 parts of stabilizer on 100 parts of copolymer, more or less, will give satisfactory results.

What we claim is:

1. A method of retarding the deterioration of acrylonitrile-butadiene-1,3 copolymers which comprises incorporating therein a small amount of antimonyl catecholate.

2. A composition comprising acrylonitrile-butadiene-1,3 copolymer and a small amount of antimonyl catecholate.

HARRY E. ALBERT.
GEORGE E. P. SMITH, JR.

REFERENCES CITED

The following references are of record in the file of this patent:

UNITED STATES PATENTS

| Number | Name | Date |
|---|---|---|
| 2,488,975 | Hunter | Nov. 22, 1949 |